United States Patent
Stiesdal

(10) Patent No.: US 6,737,757 B1
(45) Date of Patent: May 18, 2004

(54) WIND POWER PLANT AND METHOD FOR OPERATING IT

(75) Inventor: Henrik Stiesdal, Brande (DK)

(73) Assignee: Bonus Energy A/S, Brande (DK)

( * ) Notice: Subject to any disclaimer, the term of this patent is extended or adjusted under 35 U.S.C. 154(b) by 68 days.

(21) Appl. No.: 09/980,454

(22) PCT Filed: Jun. 4, 2000

(86) PCT No.: PCT/DK00/00303

§ 371 (c)(1),
(2), (4) Date: Jan. 23, 2002

(87) PCT Pub. No.: WO00/76055

PCT Pub. Date: Dec. 14, 2000

(30) Foreign Application Priority Data

Jun. 4, 1999 (DK) .......................... 1999 00795

(51) Int. Cl.[7] ................................. H02P 9/04
(52) U.S. Cl. .................. 290/44; 290/43; 290/5
(58) Field of Search ................. 290/43, 44, 5

(56) References Cited

U.S. PATENT DOCUMENTS 4,461,957 A * 7/1984 Jallen .......................... 290/40
5,907,192 A * 5/1999 Lyons et al. .................. 290/40
6,476,513 B1 * 11/2002 Gueorguiv ..................... 290/5

FOREIGN PATENT DOCUMENTS

| EP | 314882 | 5/1989 |
| EP | 635639 | 1/1995 |
| JP | 60-128861 | 7/1985 |

* cited by examiner

Primary Examiner—Dang Le
Assistant Examiner—Iraj A. Mohandesi
(74) Attorney, Agent, or Firm—James Creighton Wray; Meera P. Narasimhan

(57) ABSTRACT

The invention concerns a method for operating a windmill with variable rpm and a directly network connected primary generator. By this method there disposed a regenerative slip generator between the gear of the windmill and the primary generator, whereby the power coming from the slip may be regenerated to the electric network. The total power output from the windmill is kept constant over a certain range of slip. The invention also concerns the specific design of a windmill with such a slip generator.

8 Claims, 6 Drawing Sheets

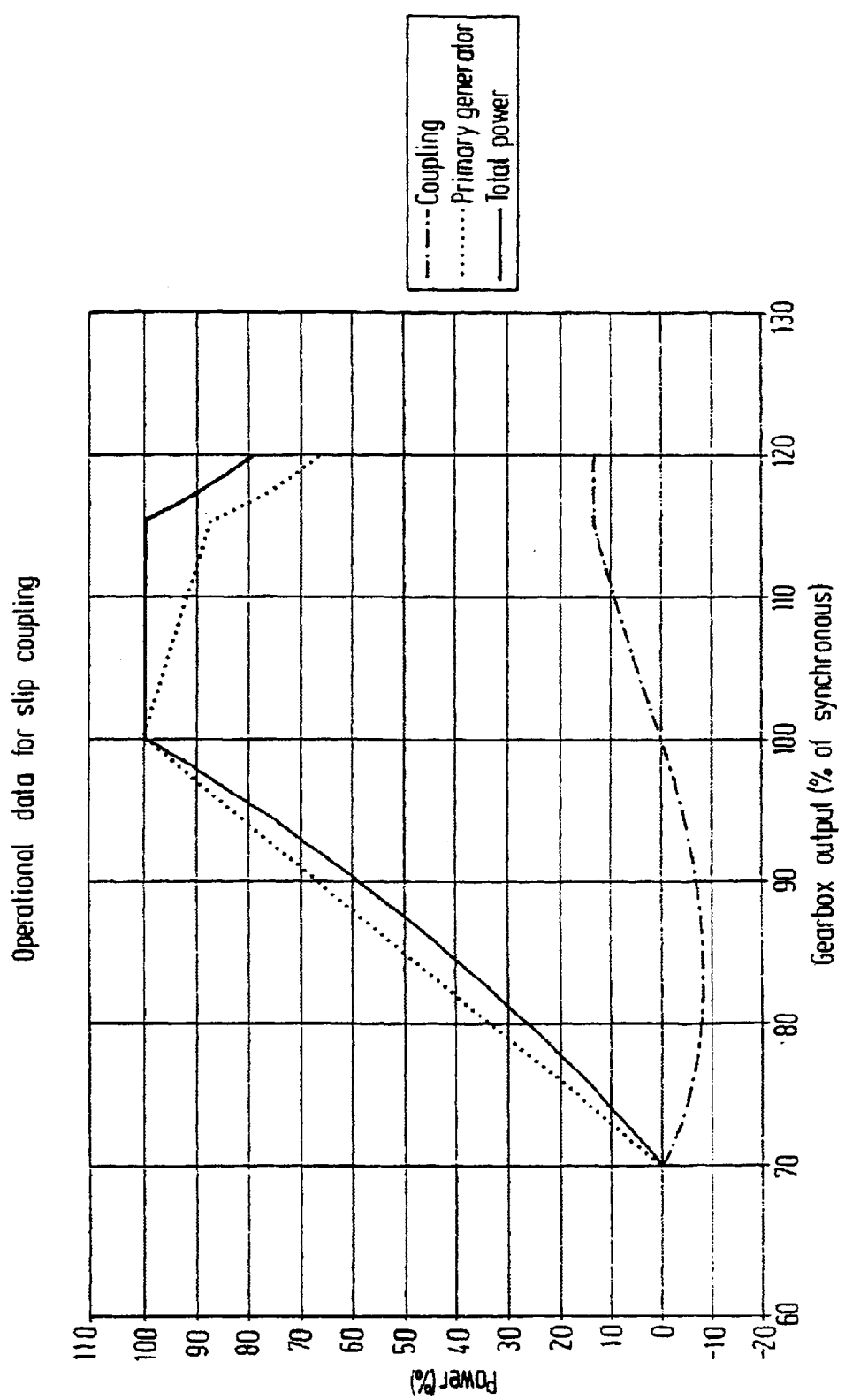

WIND POWER PLANT AND METHOD FOR OPERATING IT

BACKGROUND OF THE INVENTION

The invention concerns a method for operating windmills where a primary generator is driven by the windmill rotor, possibly with a gear mechanism, with constant or approximately constant rotational speed. The invention also concerns a windmill where a primary generator is driven by the rotor of the windmill, possibly with a gear mechanism, with constant or approximately constant rotational speed.

It is known that certain optional benefits may be achieved in windmills if one may establish operation with variable rpm.

Many modern types of windmills are provided with a directly network connected asynchronous generator. This kind of generator has significant advantages. Even if certain adjustments in the winding have been made, the directly network connected asynchronous generator is in principle just a directly network connected asynchronous motor driven at an supersynchronous rpm by an external energy source. An asynchronous motor with short-circuited rotor is the most simple and robust form of electric motor, and the asynchronous generator has the same advantages. The only wear parts are constituted by the bearings. Large production numbers on the motor side implies that the price per kW is the lowest possible.

The directly network connected asynchronous generator with short-circuited rotor has, however, also significant drawbacks in connection with windmill operation. The drawbacks are connected to the largely constant rpm for this kind of generator. By larger power outputs the generator may only be made with a slip exceeding 1% with difficulty since the power loss deposited in the rotor in principle is proportional to the slip. If the slip exceed the normal limit of the 1%, the rotor losses become so great that thermal problems may arise. With a slip of 1%, or less, the rpm of the windmill remains largely constant.

A largely constant rpm is a prerequisite for one of the two normal forms of power control, stall regulation. While it simultaneously is a prerequisite for the control, too small slip may, on the other hand, give rise to problems with power variations as a result of torsion oscillations in the transmission system. A small slip means small dampening in the generator, and therefore continuous oscillations of a certain, not insignificant, magnitude may occur.

By stall regulation the advantages by the largely constant rpm will normally exceed the disadvantages. Otherwise with the other of the two normal kinds of power control, pitch regulation, where it gives rise to considerable problems. Pitch regulation is based on mechanically setting the wings to another pitch angle on the rotor hub when the power deviates from the desired power. If the rotor absorbs other power from the wind than absorbed by the generator, the generator will accelerate until there is balance again between absorbed and yielded power. If the generator slip is small, only a slight acceleration is required for the generator to yield a significantly different power. The time for the control system to adjust the wings therefore becomes very short, and in practice pitch regulated mills with directly network connected asynchronous generator have great power variations due to variations in the wind speed.

The directly network connected asynchronous generator also has certain considerable deficiencies in connection with network quality. First, consideration to voltage variations in the net requires the coupling in of the generator to occur with power electronics since the coupling in with traditional contactors will imply large voltage variations. Second, the asynchronous generator has a not insignificant consumption of reactive power for magnetising. Usually it is necessary to provide a windmill having a directly network connected asynchronous generator with phase compensation, typically in the form of a capacitor battery.

The problem with the reactive power consumption may be solved in principle by using a directly network connected synchronous generator. This type of generator has its own technical drawbacks, including a winded rotor. On the other hand the net conditions are good. If the requirements to the net conditions were great, it could be argued that the drawbacks of the synchronous generator were acceptable. The reason that this type of generator cannot be used at all in a directly network connected version without special measures is that the slip of the synchronous generator is 0. The above mentioned drawbacks by the asynchronous generator with small slip assume their most extreme form in the directly network connected synchronous generator, and operation with 0 slip is practically impossible because of power variations. The synchronous generator may only be used in direct network connection if a slip between gear and generator is established in other ways. Such a slip may e.g. be provided with a hydraulic coupling. However, it is difficult to achieve more than a few percent slip in this way, and normally it will not be sufficient to ensure a completely satisfactory regulation.

Greater slip may be achieved by means of an electric eddy current coupling. If such a coupling is provided with adjustable magnetisation, the slip may be regulated and the coupling may be adjusted so that the torque from a certain slip becomes e.g. a hyperbolic function of the rpm, whereby the output power may be kept at nominal power. Though an eddy current coupling thus gives the necessary regulating possibility, it has, however, some very significant drawbacks. The most important drawback is probably that the power from the slip is deposited as heat in the coupling. If the windmill has e.g. a nominal power of 1 MW and if a slip of 10% is desired, up to 100 kW will be deposited as heat in the coupling. In practice, this implies such requirements to size and cooling of the coupling that this solution is not economically feasible. A secondary drawback is that a certain slip is necessary also by part load since otherwise a synchronous generator will cause power fluctuations. Also, in this range of operation the slip power will be deposited as heat. While the loss by operation at nominal power may be said to be unimportant from the view of efficiency since ample input power is available and the loss thus only has influence on the dimensioning and cooling of the coupling, by part load the loss is clearly unfavourable from an efficiency view. At wind speeds by which the windmill does not yield maximum power it is important that the efficiency is as good as possible, and a slip occurring as waste heat is only a disadvantage here.

The deficiencies inextricably associated with the directly network connected asynchronous generator with short-circuited rotor have been known in general for a long time. For stall regulated windmills where the power regulation presupposes a roughly constant rpm, the asynchronous generator is normally considered to be a solution close to optimum, and the effort has therefore been concentrated on relieving the problems connected thereto. Methods for adjusting the slip in the making of generator itself have been developed so that the specifications of the generator may be optimised for the dynamic properties of the actual type of windmill. Electronic coupling systems have been developed, and both fixed and adjustable phase compensating systems may be supplied as standard.

The situation is different for pitch-regulated windmills. The drawbacks associated with operation by pitch-regulation and small slip have appeared to be significant, and largely all commercial windmills with pitch regulation by now have some form of variable rpm.

The variable rpm may be established in different ways.

In a simple embodiment, the directly network connected asynchronous generator with short-circuit rotor may be substituted by a likewise directly network asynchronous generator with winded rotor, slip rings and external resistors. In this configuration the greater part of the rotor loss is deposited in the external resistors, and the slip is proportional with the rotor power. An arbitrarily large slip may be achieved. The configuration has, however, significant drawbacks. A winded rotor and slip rings are to be utilised, both cost-raising elements, and with slip rings and their brushes wear parts are introduced which considerably reduce the sturdiness of the generator. If a significant increase of the slip is to be obtained, the rotor loss becomes unwantedly considerable also by part load, and normally it will therefore be necessary to introduce a kind of regulation of the external resistors, thereby causing further complexity.

In a more advanced embodiment, a directly network connected asynchronous generator with winded rotor is used where the slip rings and the external resistors are substituted by power electronics and resistors mounted on the rotor. As in the embodiment with external resistors, the slip is proportional with the rotor power, and with the power electronics the resistance may be regulated so that the losses by part load are minimised. Even though the difficulties with slip rings and brushes are avoided, this arrangement has, however, substantial disadvantages. A winded rotor still has to be used, and removal of the slip rings implies application of rotating power electronics communicating with the stationary control of the windmill which in turn reduces the sturdiness of the generator to a significant degree. Since the resistors are not external there are limits to the size of the thermal load that may be dissipated, and thereby how large the slip may be. Typically, values of 10% are indicated.

Common to the two above mentioned solutions are that with an increased slip only upward regulation of rpm compared with the synchronous rpm is possible, not downward. To this is added that the problem with the reactive consumption for magnetisation for the asynchronous generator is unchanged, and external phase compensation thus is still to be used.

In a third embodiment, the problem with the reactive consumption is solved simultaneously with greater flexbility in the rpm is achieved. Again, a directly network connected asynchronous generator with winded rotor and slip rings is used but the external resistors are replaced by a 4-quadrant frequency converter coupled to the network. In this way the power deposited in the rotor may be converted and supplied back to the network. The nominal power of the stator may be reduced correspondingly with a power contribution from the rotor. By suitable dimensioning the frequency converter may supply reactive power to the stator winding, and the need for external phase compensation may be removed. In contrast to the above-mentioned solutions, the rpm may here be regulated both up and down, and it is mainly the dimensioning of the frequency converter that sets the limits to the variations in the rpm. The dimensioning is not quite simple if the frequency converter also is to supply reactive power to the stator but generally it applies that the frequency converter has to have a size compared with the stator corresponding to the desired slip. Typically there may be a need for a range of regulation of +/−20%.

In spite of the greater flexibility, the arrangement with a frequency converter on a winded rotor, however, has its specific disadvantages. A winded rotor and slip rings are still to be used. As the rotor voltage is proportional with the slip, harmful over-voltages on the frequency converter may occur in addition if the slip exceeds the desired value during regulation. Conversely, regulation close to the synchronous rpm is usually not possible as the slip is small here, and with that the voltages are small.

In a fourth embodiment, a directly network connected asynchronous generator with short-circuited rotor is used which is connected to a 4-quadrant frequency converter coupled to the network. In this way the whole power is converted before it is supplied back to the network. The frequency converter may supply reactive power to the generator, and the need for external phase compensation may be removed. The rpm may be regulated both up and down, and since the frequency converter is dimensioned to full power the regulating range will typically be 10–150%.

In spite of the simpler design where the robust squirrel-cage generator may be used, the arrangement with full frequency conversion also, however, has its own drawbacks. The frequency converter itself becomes large and expensive as it has to be able to transmit the whole power. The losses in the converter become correspondingly large, typically 3–4% of the generator power. This results in considerable cooling requirements, and the physical dimensions of the frequency converter itself may imply that it may be located in the windmill itself only with difficulty. Though by the frequency converter there may be achieved good network conditions as seen from a static view, a frequency converter also gives harmonic overfrequencies on the net to a certain extent. This is also the case for the solution with a frequency converter on the rotor side only but in that situation the stator circuit works to a certain extent as a filter. In the solution mentioned here with full frequency conversion, the overfrequencies will be unfiltered, and it may be necessary to use external reactors as well as a special type of transformer contributing to the filtering.

Many further combinations of types of generators and frequency converters are known, including more advanced rotor configurations, permanently magnetised generators etc., but common to all is that they still have their individual drawbacks.

SUMMARY OF THE INVENTION

The object of the present invention is to provide a method and an apparatus for operating windmills with variable rpm and which reduces the drawback connected with the known methods.

This object is achieved by a method of the kind mentioned in the introduction which is peculiar in that between the rotor of the windmill and the primary generator there is disposed an apparatus comprising a slip generator and a frequency converter adapted thereto or fixed resistor, and which may transmit the torque to the primary generator with a certain amount of slip, and where the power coming from the slip may be regenerated to the electric network via the slip generator and the frequency converter or may be deposited via the resistor as heat at an optional location.

The windmill according to the invention is peculiar in that between the rotor and the primary generator there is disposed an apparatus comprising a slip generator and the frequency converter or resistor adapted thereto, and which may transmit the torque to the primary generator with a certain amount of slip, and where the power coming from the slip may be regenerated the electric network via the slip generator and the frequency converter or may be deposited via the resistor as heat at an optional location.

Thus there is provided a solution based on a regenerative slip generator which is inserted between the gear and the primary generator. The regenerative slip generator may be regarded as secondary generator the output power of which is proportional with the slip. The slip generator is controlled with a frequency converter which feeds the power from the slip back to the network. The slip generator may be said to function as a slip clutch.

Alternatively there is utilised either a fixed or an adjustable resistor (a heating element) which makes possible to deposit the heat at an optional location where the resistor is mounted.

These solutions have many advantages.

The primary generator may be designed as a standard synchronous generator with the associated advantages concerning the net conditions. Since the synchronous generator does not have to be provided with a frequency converter, it does not need the special modifications normally required for this, like isolated bearings and special protection against transients. By establishing the slip generator as a separate unit, the advantage is thus achieved that the primary generator may be a standard generator without increased complexity.

The total power from the windmill becomes the sum of the power from the slip generator and the primary generator. The primary generator may therefore perform less power as compared with the nominal power of the windmill. The dimensioning occurs with basis in the need for speed variation. Experience shows that a speed variation of less that 10% is sufficient for a satisfactory regulation. With a slightly conservative dimension the slip generator may e.g. be made as corresponding to a normal slip of 10% and thereby a power of 10% of the nominal power of the windmill. The primary generator is then made for yielding 90% of the nominal power of the windmill.

When the slip generator is dimensioned according to a slip of 10%, the frequency converter controlling the slip generator also only has to have a power of 10% of the nominal power of the windmill. This implies that the losses in and the harmonic disturbances from the frequency converter are considerably reduced as compared with the situations where the frequency converter is to transmit the total power.

With a particularly advantageous embodiment of the slip generator may be achieved the very significant advantage that it can be retrofitted on an existing windmill. Thereby a windmill appearing to have unfavourable operating conditions at constant rpm may easily be rebuilt for variable rpm without any substantial measures.

The slip generator may in principle have a roughly linear torque characteristic at pure ohmic load. The possibility of redundancy in the system is thereby obtained if the frequency converter should fail. In case of failure of the converter, the output from the slip generator is short-circuited with resistors and the windmill may then continue to operate. The slip generator functions as a slip clutch, the characteristic of which roughly corresponds to that of a hydraulic coupling with the drawback connected with the hydraulic coupling in the form a load dependent loss, but even though this mode of operation is not desirable in the long term, it is much to prefer as compared with a situation where the mill has to stand still. Not least on seabased windmill farms where access conditions may be difficult, an automatic by-coupling of the frequency converter in case of failure may give an appreciable in safety against loss of availability.

Compared with windmills with direct coupling of gear and generator, by the slip generator there may be achieved the advantage that the regulation of the slip generator by the frequency converter may be set to transmit torque only in one direction from the gear to the generator. Hereby is avoided that the windmill may absorb power as a kind of ventilator at brief drops in the wind speed when the mean wind speed is about the speed where the windmill starts to yield power.

The slip generator has furthermore the advantage that it may be made with a well-defined upper limit for its torque capacity. Thereby it will function as a slip clutch by brief torque shocks from the generator. Such torque shocks may e.g. occur by network disturbances and may cause damages on the gear by direct coupling of gear and generator. With the slip generator the risk of damages may be completely eliminated.

At the coupling in of the windmill, both the phase and the frequency conditions for the primary generator have to fit to the network. The possibility of ohmic load of the slip generator may be utilised for obtaining special advantages in a situation of coupling in. The starting point is that the windmill stands still and is released for operation. The rotor of the windmill is accelerated by the wind. The frequency converter of the slip generator is by-coupled with resistors dimensioned so that the characteristic of the coupling corresponds to a relatively large slip. As the inertia of the primary generator is relatively small, the rotor of the generator will be driven with approximately the same rpm as the output shaft of the gear during the acceleration period. When the synchronous rpm is reached, the rpm is maintained at synchronous rpm as far as possible by pitch regulation of the rotor of the windmill. The rpm will, however, vary somewhat because of the turbulence of the wind. While the rpm is kept roughly at synchronous rpm, the primary generator is coupled in on the network by means of the frequency converter which in this situation is not required for operating the slip generator having a purely ohmic load. The coupling in may take place gradually so that the phase and frequency conditions for the generator are smoothly accommodated to the net. The coupling in is finished by the frequency being by-coupled with a contactor when the net and generator sides of the frequency converter are completely synchronous. The primary generator is now directly coupled to the network. The dimensioning of the resistors of the generator to a relatively large slip implies that variations in the rpm do not give rise to unacceptable power variations from the primary generator. The frequency converter is now connected to the slip generator, the ohmic load of the slip generator is decoupled, and the frequency converter may then control and regulate the coupling as desire.

By the above method for coupling in use of conventional synchronisation equipment for the primary generator is avoided which by itself may result in a saving. More important, however, it is that the coupling in may be chosen in an arbitrarily gentle way so that the primary generator may be coupled to even very weak networks without experiencing voltage variations.

In its basic form the slip generator is a slowly running generator being rotationally symmetrical or balanced in other ways so that both stator and rotor may endure rotating with the nominal speed of the primary generator of the windmill, preferably 1500 rpm.

Slip generator may suitably be designed for a nominal speed (relative between stator and rotor of the slip generator) of 150 rpm. The relative speed between stator and rotor in the slip generator will then be designated the internal speed, and the speed with which both components are made to rotate will be designated the external speed.

The slip generator has to be designed for a nominal torque corresponding to the torque for the primary generator. It is an advantage if the torque may be maintained through-out the whole internal speed range of the slip generator. For a 1 MW windmill this torque may be 7 kNm.

Thus a multipolar, slow-running generator has to be provided which may yield an approximately constant torque irrespectively of the internal speed and which may simultaneously stand up to rotating at 1500 rpm and preferably slightly more.

For a 1 MW windmill with 7 kNm, the power in the slip generator is about 100 kW at nominal internal speed of 150 rpm. At an internal speed of 0 rpm where the torque is maintained at 7 kNm, the active power is of course 0 while on the contrary there is a small loss for maintaining a stationary magnet field which may retain the rotor.

Provided the existence of a safely functioning frequency converter it is thus possible to operate the slip generator in an internal speed range from −150 to +150 rpm with maintained full torque. Thus it is possible that slip generator may act as a completely rigid coupling between the gear and the primary generator but it may also cause up to 10% speed difference or more between the gear and the generator shaft if the nominal external speed is 1500 rpm.

By load with fixed resistor functioning as heating element there is achieved a torque which is 0 at an internal speed of 0 and which is maximum at the nominal internal speed. This configuration is passive in terms of regulation but could give an external slip to a motor or generator with small or no slip and which in some situations may prevent torsion oscillations. In this application, the slip generator has the function which hydraulic couplings or eddy current couplings are often used for. However, there is the advantage that waste heat from the slip is not deposited in the coupling but at the optional location of the heating element.

When loading with an adjustable resistor it is possible initially to operate with a short-circuit and to increase the resistance gradually. Here the slip generator would yield a torque which increases when the internal speed exceeds 0. By coupling in of the adjustable resistor it is possible maintain full torque from the speed of 0 to the nominal internal speed. Hereby a uniform load may be achieved at nominal external power and may be said to fulfil the function where previously hydraulic couplings or eddy current couplings have been used. Here, also, is achieved an advantage by the waste heat from the slip not being deposited in the coupling but at the optional location of the heating element.

With a design of a windmill according to the invention where the slip generator is loaded or supplied from the frequency converter is possible to operate within +/−nominal internal speed with optional torque load. Compared to a design with resistors there is thus possibility of an extended speed range and at the same time full flexibility in the regulation also when the generator goes down into the motor range and the slip power will simultaneously be regenerated and supplied to the electric network.

Reference is made to the claims for the means for achieving the desired effect.

The invention is described more closely below as reference is made to the figures. The primary generator in the description is assumed to be a synchronous generator with fixed rotational speed of 1500 rpm while the slip generator is assumed to be a synchronous generator provided with a frequency converter giving a speed range of 0–250 rpm in the coupling. In a real embodiment other types of generators and speed ranges may be selected.

DESCRIPTION OF THE DRAWING

The invention is described more closely in the following as reference is made to the drawing where:

BRIEF DESCRIPTION OF THE DRAWINGS

Figure 1:
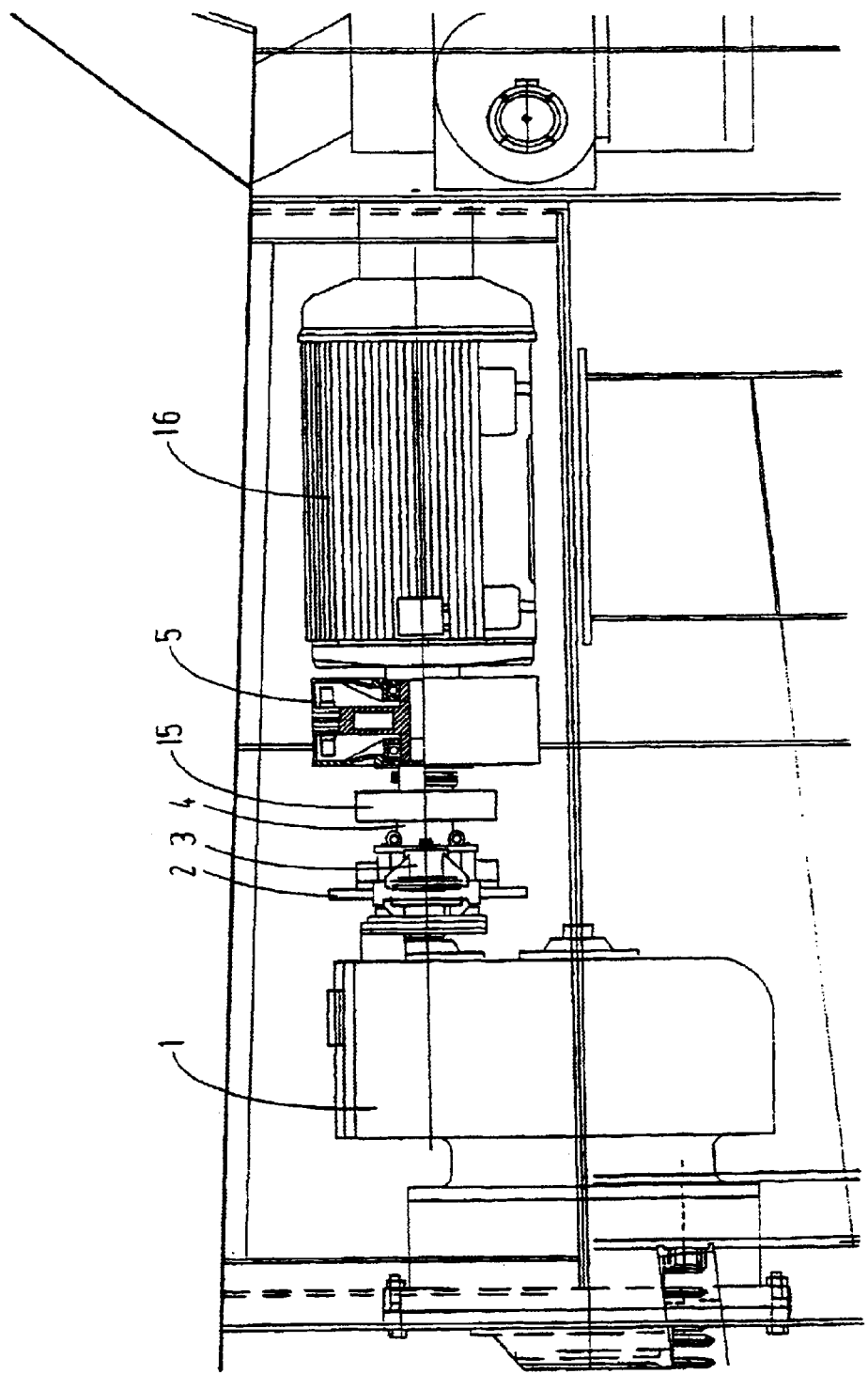
Figure 2:
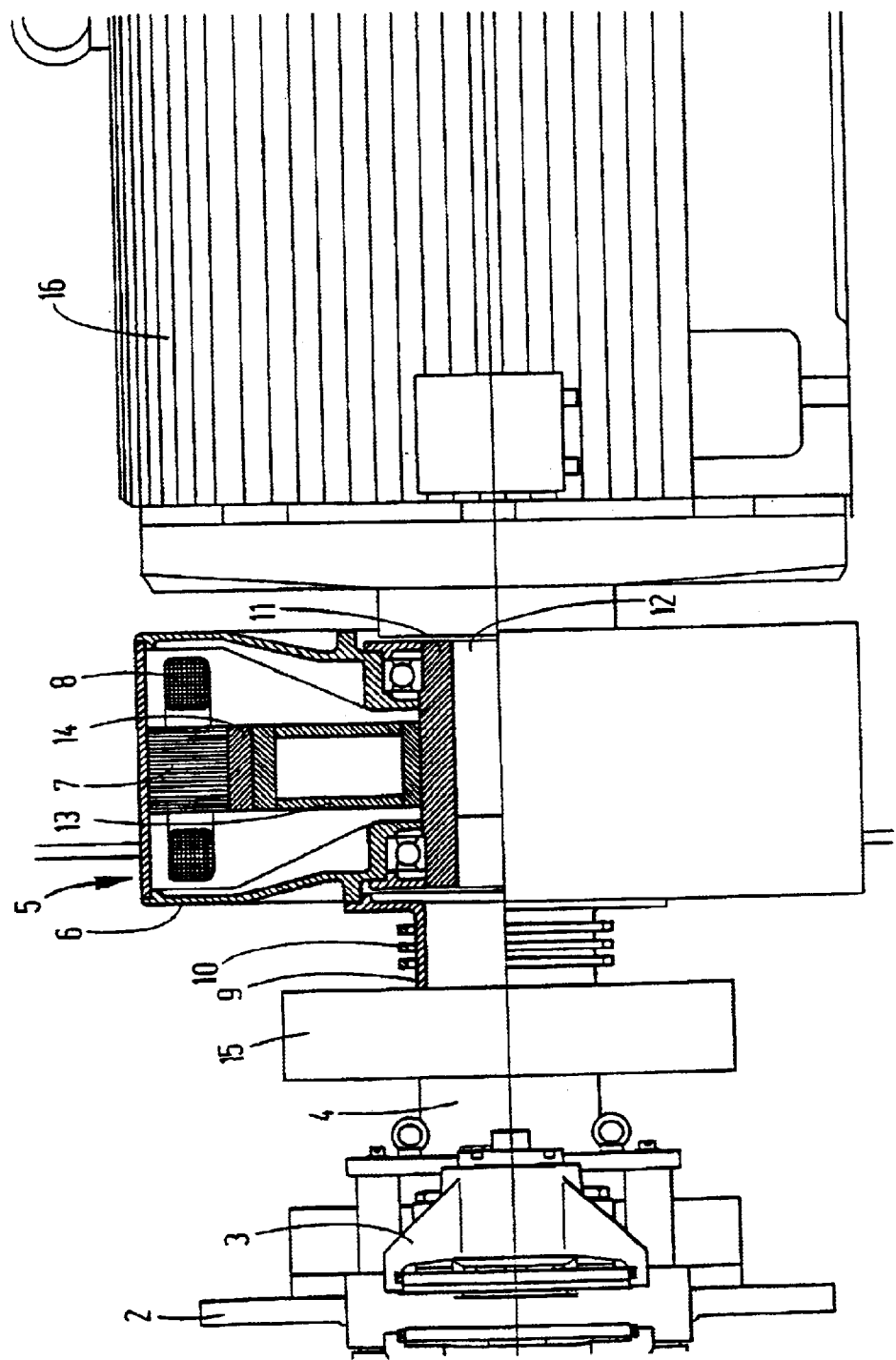

FIG. 1 is a partial view of a transmission system of a windmill according to the invention, FIG. 2 is an enlarged detail of FIG. 1, and FIGS. 3–6 show curves for torque and power conditions in a windmill operated by a method according to the invention.

DETAILED DESCRIPTION OF THE PREFERRED EMBODIMENTS

FIG. 1 shows a detail of the transmission system in a windmill according to the invention. A gear 1 is provided with a brake disc 2 and a brake calliper 3. An elastic coupling 4 connects the gear to a slip generator 5. The slip generator is carried by a primary generator 16 so that the slip generator is mounted between the gear and the primary generator. The coupling is shown in semi cross-section while most of the other components being standard in windmills are shown in normal side view.

FIG. 2 shows that the elastic coupling 4 has an elastic element 15. The stator housing 6 of the slip generator is provided with a stator pack 7 and a stator winding 8. The stator housing is connected with the elastic coupling element 15 with a connecting piece 9. The connecting piece carries the slip rings 10 receiving the power from the stator winding 8. The rotor of the coupling has a hollow shaft 11 mounted on the shaft 12 of the primary generator. The rotor 13 carries a number of poles 14, here made as permanent magnets. Frequency converter and resistors for the coupling are not shown on the Figure.

Figure 3:
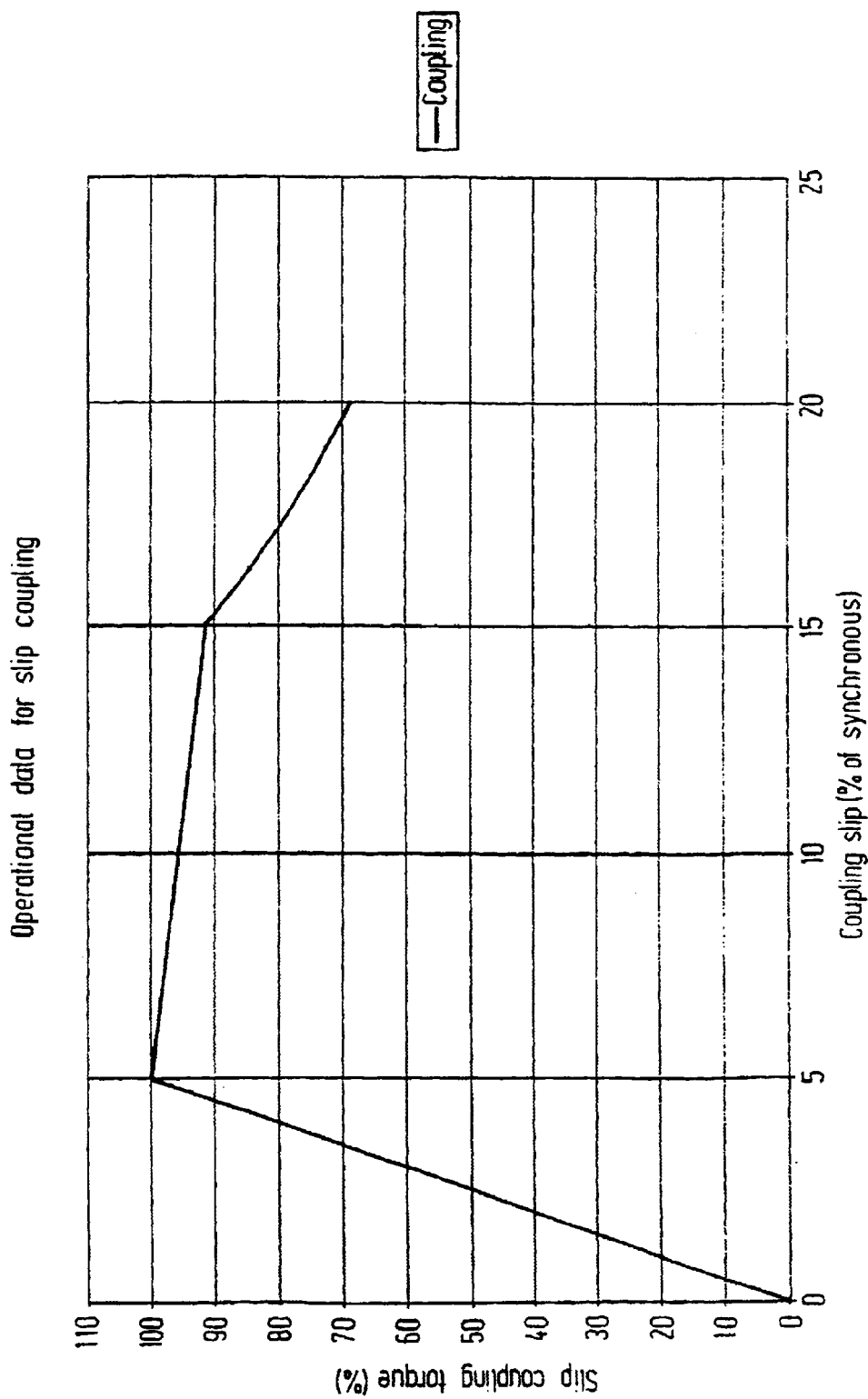

FIG. 3 shows an example of a torque characteristic for a slip generator made according to the invention.

When the slip is 0, the primary generator shaft keeps up with the output shaft of the gear, and the coupling torque is 0. As the rotational speed of the gear rises, the slip also rises, and the torque characteristic is approximately linear from 0 to 5% slip.

When full torque has been achieved, the torque characteristic of the slip generator is changed so that the torque is transformed to a hyperbolic function of the slip. If the slip exceeds a certain limit, switching to a new hyperbolic function occurs which maintains the power of the slip generator at a certain level for avoiding thermal overload of the coupling.

Figure 4:
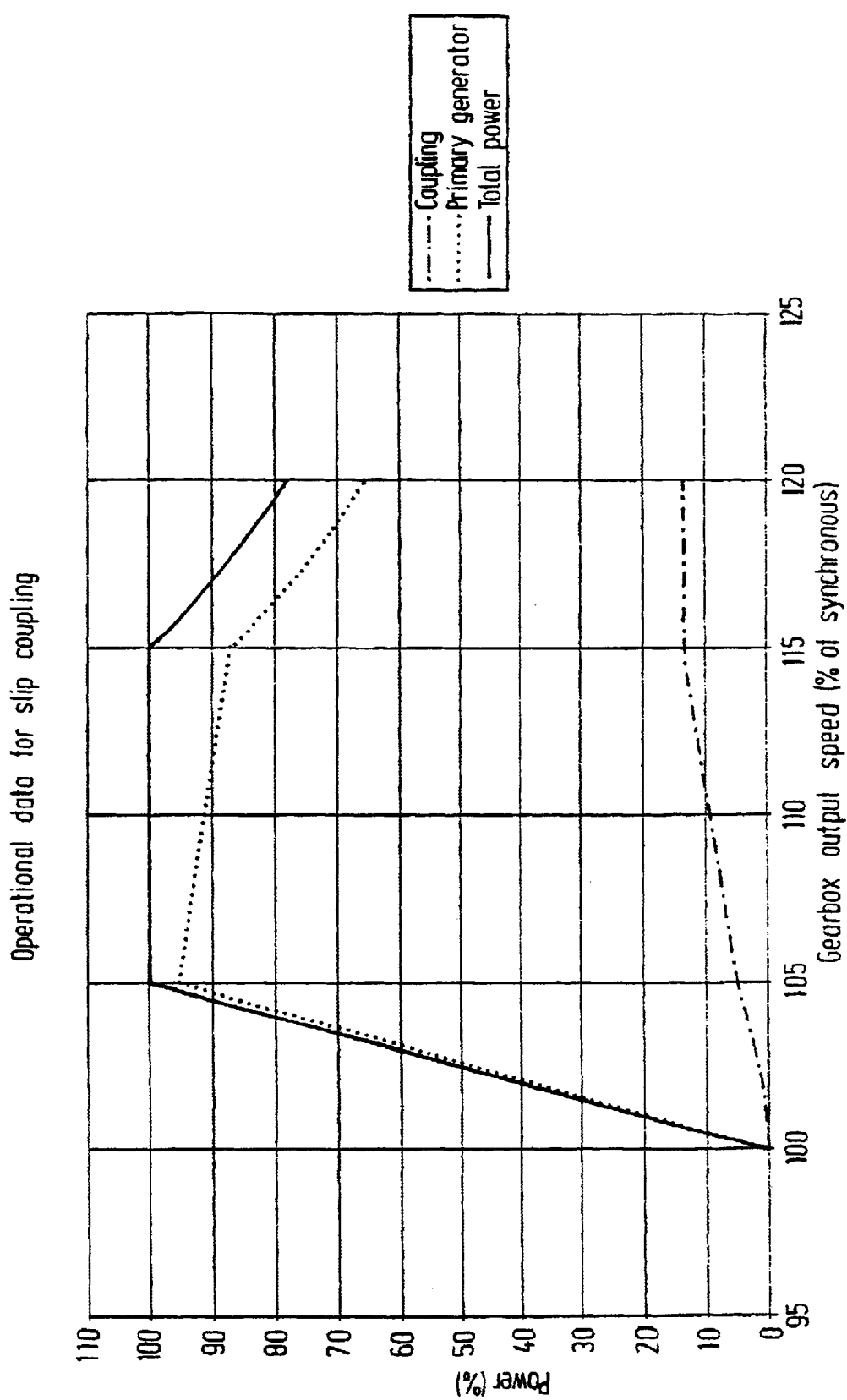

FIG. 4 shows the power conditions from the whole windmill becoming the result of a torque characteristic as shown in FIG. 3.

At the synchronous rpm, 100%, the primary generator shaft keeps up with the gear output shaft, the torque is 0, and no power is deposited in the slip generator. As the rpm of the gear rises, the slip between the gear and the generator increases, and an increasing torque is transmitted in the slip generator. When full torque is reached at 5% slip, the windmill yields 100% power. Here the torque characteristic of the slip generator is changed as shown in FIG. 3 so that the total power is maintained at 100%. As the rpm is increased, the power absorbed by the coupling also increases (even though the torque decreases slightly), and the power of the primary generator falls correspondingly so that the total power becomes constant. This characteristic does not require any control of the primary generator but is achieved by the clear connection of rpm and torque on the slip generator, controlled by the frequency converter. When the slip exceeds a certain limit, the slip generator power is maintained at a certain level for avoiding overload, and the total power of the windmill begins to fall again.

The shown characteristic is just an example of an advantageous method of operating the windmill. Many other torque characteristics and thereby total characteristics for the windmill are also possible with the slip generator. A special group is constituted by characteristics where the slip generator in the lower part of the operating range is operated as motor. Thereby the speed range of the windmill may be extended considerably.

Figure 5:
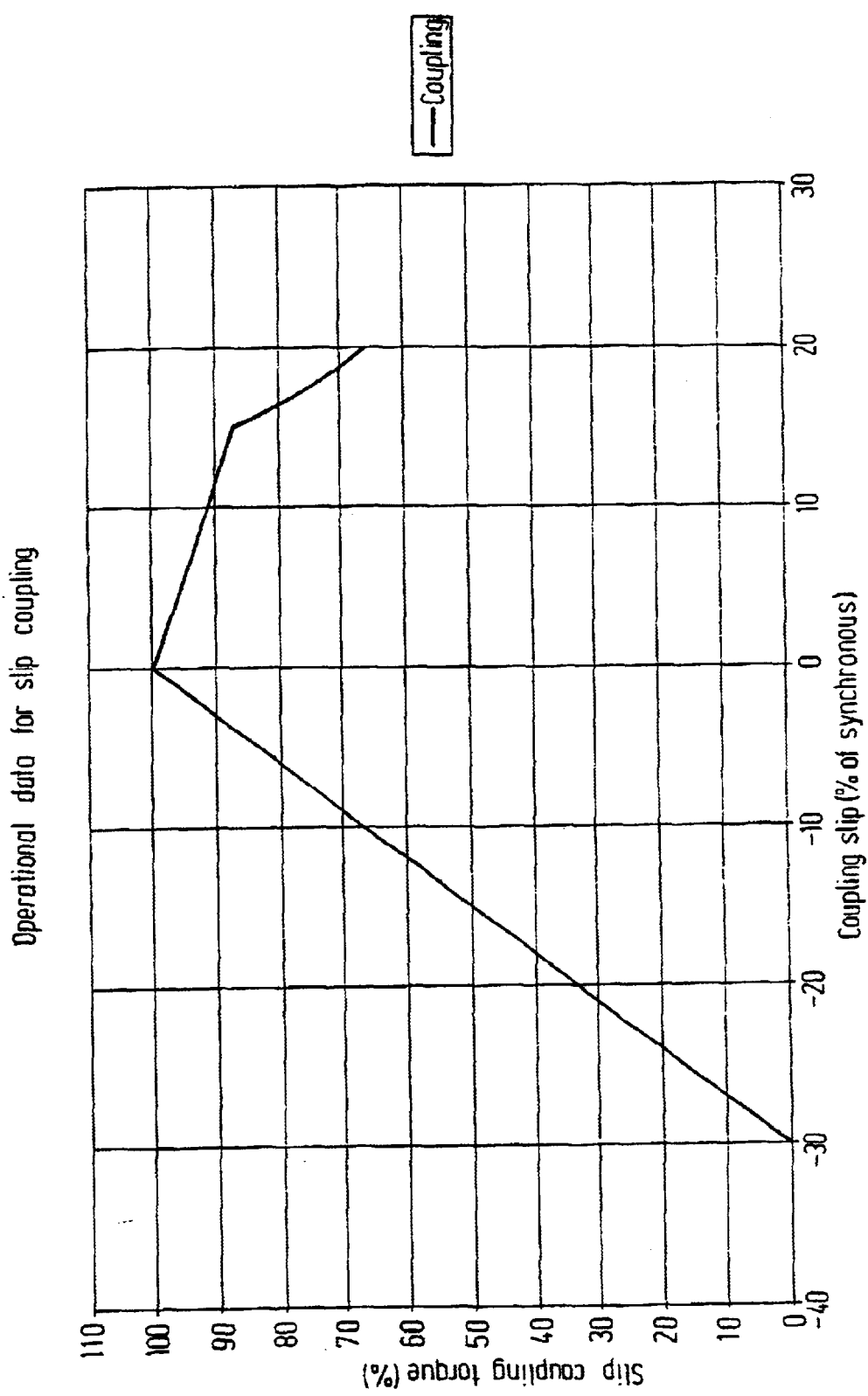

FIG. 5 shows an example of a torque characteristic of a slip generator according to the invention, and where the coupling is operated as motor in a part of the operating range.

The coupling is operated as motor with a torque characteristic being a linear function of the slip. When the slip is 0, the primary generator shaft keeps up with the gear output shaft, and the torque of the coupling is at maximum. Here the torque characteristic of the slip generator is changed so that the torque is transformed to a hyperbolic function of the slip wile simultaneously the coupling begins to function as generator. If the slip exceeds a certain limit, switching to a new hyperbolic function occurs which maintains the slip generator power at a certain level for avoiding thermal overload of the coupling.

FIG. 6 shows the power conditions for the whole windmill becoming the result of a torque characteristic as shown in FIG. 5.

At the subsynchronous rpm, here 70%, where the coupling begins to yield torque, the windmill starts to yield power. In the range from 0 to 100% power the primary generator yields additional power as compared with the power yielded by the windmill which corresponds to the power absorbed by the coupling as motor. When the slip is 0, the torque of the coupling is maximum but as the slip is 0, no power is deposited in the slip generator. The total power is here yielded by the primary generator, and the level has been chosen to 100% of the nominal power. Here the torque characteristic of the slip generator is changed as shown in FIG. 5 so that the total power is maintained at 100%. As the rotational speed increases, the power absorbed by the coupling also rises (even though the torque falls slightly), and the power from the primary generator falls correspondingly so that the total power becomes constant.

What is claimed is:

1. A method for operating a windmill where a primary generator is driven by the windmill rotor, possibly by a gear mechanism, with constant or approximately constant rpm, disposed between the rotor of the windmill and the primary generator is an apparatus comprising a slip generator and a frequency converter or resistor adapted thereto, and which transmits the torque to the primary generator with an amount of slip, and wherein the power coming from the slip is regenerated to the electric network via the slip generator and the frequency converter or deposited via the resistor as heat at an optional location, wherein the power coming from the slip between the windmill rotor and the primary generator is delivered to the electric network by the frequency converter.

2. A method according to claim 1, wherein the torque in the apparatus is regulated in such a way that the total power output from the windmill is kept constant over a range of slip.

3. A method according to claim 1, wherein the apparatus is operated both as motor and as generator.

4. A method according to claim 1, wherein the slip between the windmill rotor and the primary generator has magnitude from −50% to +50%.

5. A method according to claim 1, wherein the frequency converter of the apparatus is temporarily disconnected from the apparatus and is used by synchronising the primary generator to the electric network.

6. A method according to claim 1, wherein the resistor is used in designs with less slip for preventing torsion oscillations.

7. A windmill where a primary generator is driven by the rotor of the windmill, possibly with a gear mechanism, with constant or approximately constant rpm, disposed between the rotor and the primary generator is an apparatus comprising a slip generator and a frequency converter or resistor adapted thereto, and which transmits the torque to the primary generator with an amount of slip, and wherein the power coming from the slip is regenerated to the electric network via the slip generator and the frequency converter or deposited via the resistor as heat at an optional location, wherein the apparatus is a synchronous generator mounted on the shaft of the primary generator.

8. A windmill according to claim 7, wherein the apparatus is arranged to function either as motor, as generator, or both as motor and generator.

* * * * *